(12) United States Patent
Moore et al.

(10) Patent No.: US 7,792,024 B1
(45) Date of Patent: Sep. 7, 2010

(54) IO LATENCY REDUCTION

(75) Inventors: Jeffrey C. Moore, Daly City, CA (US);
Douglas S. Wyatt, Sunnyvale, CA (US);
William George Stewart, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1546 days.

(21) Appl. No.: 11/083,829

(22) Filed: Mar. 18, 2005

(51) Int. Cl.
H04L 12/26 (2006.01)

(52) U.S. Cl. .................... 370/230; 370/503

(58) Field of Classification Search ............. 370/230, 370/503
See application file for complete search history.

(56) References Cited

U.S. PATENT DOCUMENTS

| | | | |
|---|---|---|---|
| 5,664,226 A | 9/1997 | Czako et al. | |
| 6,862,635 B1 | 3/2005 | Alverson et al. | |
| 2001/0008535 A1 | 7/2001 | Lanigan | 370/487 |
| 2002/0081098 A1 | 6/2002 | Scally | |
| 2005/0240745 A1 | 10/2005 | Iyer et al. | |
| 2005/0288805 A1 | 12/2005 | Moore et al. | 700/94 |
| 2006/0074637 A1* | 4/2006 | Berreth | 704/201 |

FOREIGN PATENT DOCUMENTS

| | | |
|---|---|---|
| EP | 0 830 026 A2 | 3/1998 |
| EP | 0830026 A2 | 3/1998 |
| EP | 1 143 719 A2 | 10/2001 |
| EP | 1143719 A2 | 10/2001 |
| WO | WO 01/26374 A1 | 4/2001 |

OTHER PUBLICATIONS

Hughes, M., "Turning streams inside out, Part 2: Optimizing internal Java I/O", XP-002348074, retrieved from the Internet Jun. 10, 2005: <URL:http://www-128.ibm.com/developerworks/jaca/library/j-io2/?t=egrL296&p=streams2> 17 pages.
Notification Concerning Transmittal of International Preliminary Report on Patentability (Chapter 1 of the Patent Cooperation Treaty) received in International application No. PCT/US2005/02139.

(Continued)

*Primary Examiner*—Jason E Mattis
(74) *Attorney, Agent, or Firm*—Hickman Palermo Truong & Becker LLP

(57) ABSTRACT

An application and audio driver communicate audio data via a ring buffer using a system interface. An application reads or writes data from the buffer in a unit of data. Positions within the buffer correspond to a particular time. To write data to the buffer at a particular position in the buffer that corresponds to a particular time, an application is awaken a period of time ("client-side offset") before the driver reaches the position. The period of time is computed based on a variety factors. One factor is the amount of time the system interface assumes an application uses to write the unit of data to the buffer. For operations that entail the application inserting data into the buffer, the application may specify a weight value to apply to the factor to reduce it and the latency period.

34 Claims, 4 Drawing Sheets

OTHER PUBLICATIONS

Current claims of PCT/US05/20139.

"Notification of Transmittal of the International Search Report and the Written Opinion of the International Searching Authority, or the Declaration" as received in related PCT case, International application No. PCT/US2005/02139, dated Mar. 29, 2006.

Hughes, M., "Turning streams inside out, Part 2: Optimizing internal Java I/O" XP-002348074 (2002), 17 pages.

Clifton, David, "pipe.c", A Kla2 Module, retrieved from: http://www.codelode.com/Kernel/kla2pipec.html , 2003, 11 pages.

* cited by examiner $CO_2 = S + U B$, WHERE $U<1$

U= CO-EFFICIENT DYNAMICALLY SPECIFIED BY A CLIENT APPLICATION VIA API

IO LATENCY REDUCTION

FIELD OF THE INVENTION

The present invention relates to I/O multi-media digital data, and in particular, reducing I/O latency when processing multi-media data.

BACKGROUND

Electronic devices, such as computer systems, typically communicate with audio devices through device drivers associated with the audio devices. For example, a computer system plays sound on a speaker by sending audio data to a device driver designed for the speaker. Similarly, a computer system captures audio information from a microphone by receiving audio data from the device driver associated with the microphone.

Various approaches may be used to handle the communication of audio information between client applications ("clients") that use audio information and the device drivers of audio devices. For example, according to an interrupt-based approach, a direct connection is established between the driver and its client application. Any time the driver wants audio data from the client, the driver raises an interrupt, suspending other activity on the Central Processing Unit ("CPU") of the computer system on which the client is running. Therefore, for a certain period of time, the driver is in control of the computer system. Also, constant use of the interrupt to communicate data entails a lot CPU overhead when communicating with multiple clients.

To avoid problems associated with the interrupt approach, decoupled multithreading is used. Under decoupled multithreading, execution of a device driver is decoupled from execution of its client application by using separate threads of execution to execute the client application ("client threads") and separate threads of execution to execute the device driver ("device threads"), and using a ring buffer to communicate data between the client application and the device driver.

Specifically, the device driver, being executed by a device thread, reads audio data from the ring buffer at a particular position in the ring buffer; the client application, being executed by a client thread, feeds audio data into the ring buffer at a point ahead of the device driver so that the device driver continues to have new audio data to read. Similarly, the device driver writes audio data into the ring buffer; the client application, in turn, reads audio data from the ring buffer at a rate to ensure that the device driver does not overwrite unread audio data.

To add data to the ring buffer, the client application writes a pre-arranged quantum of data to the ring buffer, referred to herein as a unit of buffering or buffer unit. An operation performed by the client application to add a buffer unit of data to a particular position in the ring buffer is referred to herein as a client write operation. A buffer unit holds audio representing sound for a period of time. The period of time is referred to herein as the duration of the buffer unit. If a buffer unit holds audio for 11 milliseconds of playback, the duration of the buffer unit is 11 milliseconds.

To add data to a particular position in the ring buffer where the device driver will read data, a client write operation is commenced a period of time in advance of the device driver reaching the position. There are various reasons for commencing the write operation in advance. For example, it takes a period of time for the client to generate and write the data. The length of the period depends on such factors on how long it takes for the client application to perform a write operation.

Second, the position of the ring buffer from which the device driver is or will read data can only be tracked within a margin of error. The client application should be called a time period sufficiently in advance to allow the client application to complete writing the buffer unit of data at a particular position in the ring buffer position before the device driver reaches that position, with an allowance for the margin of error.

This offset period of time in advance represents how close a client may add data to the current position of the device in the ring buffer to have the device driver read the data and have it output as sound. Thus, the offset period of time represents the minimum latency between when a client write operation is commenced and when the data is read by the device driver.

Latency is an important measure of responsiveness. The greater the latency, the less responsive an audio system is. Other factors relevant to the latency in an audio system include the amount of time it takes a device to transfer the data from the computer to the device and the amount of time the device takes to translate the data into a perceivable form (e.g. converting digital audio into analog audio) once the data has reached the device.

To schedule client write operations, the offset period of time the operation must be commenced in advance of the current position of the reader is estimated and the estimate used to determine when to commence the client write operations. The estimate of this period of time is referred to herein as the client-side offset. For example, to add data at a particular position in the ring buffer, a client write operation is commenced no later than the client-side offset before the time the device reaches the position.

The client-side offset is estimated based on the assumption that, to perform a write operation to add a buffer unit of data to a ring buffer, the client application requires a time period equal to the buffer unit duration. Based on this assumption, the client-side offset is calculated so that it includes a buffer unit duration plus the margin of error for tracking the device driver's read position in the ring buffer.

Using the client-side offset to schedule client write operations renders the client-side offset a built-in latency. Because client write operations to add data to a certain position in the ring buffer are scheduled based on the client-side offset, the client-side offset is a scheduled latency that is always realized. Furthermore, if the client-side offset includes the buffer unit duration, the buffer unit duration becomes a built-in latency, regardless of how long execution of a client write operation actually takes.

Based on the foregoing, there is clearly a need for an approach for calculating a client-side offset that avoids the built-in latency attendant to using the buffer unit duration to schedule client write operations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Calculation of a client-side offset is based, at least in part, on a sum of factors. One factor is the buffer unit duration. According to an embodiment of the present invention, the application can specify a weight to apply to the factor, thereby reducing the client-side offset and improving responsiveness.

Embodiments of the present invention are illustrated by using a ring buffer to communicate audio data. However, an embodiment of the present invention is not limited to audio data. Audio data is merely one type of information that may be communicated through a device driver between an application running on a computer or electronic device. Other types of data include any form of multi-media data, and in particular video. Multimedia data is digital data that represents audio or video and that can be played or generated by an electronic device, such as a sound card, video card, or digital video recorder. A quantity of multimedia data represents audio or video for a period of time. Finally, an embodiment of the present invention may be used to communicate any form of information that is communicated to a device through a device driver and ring buffer.

Audio I/O System

Figure 1:
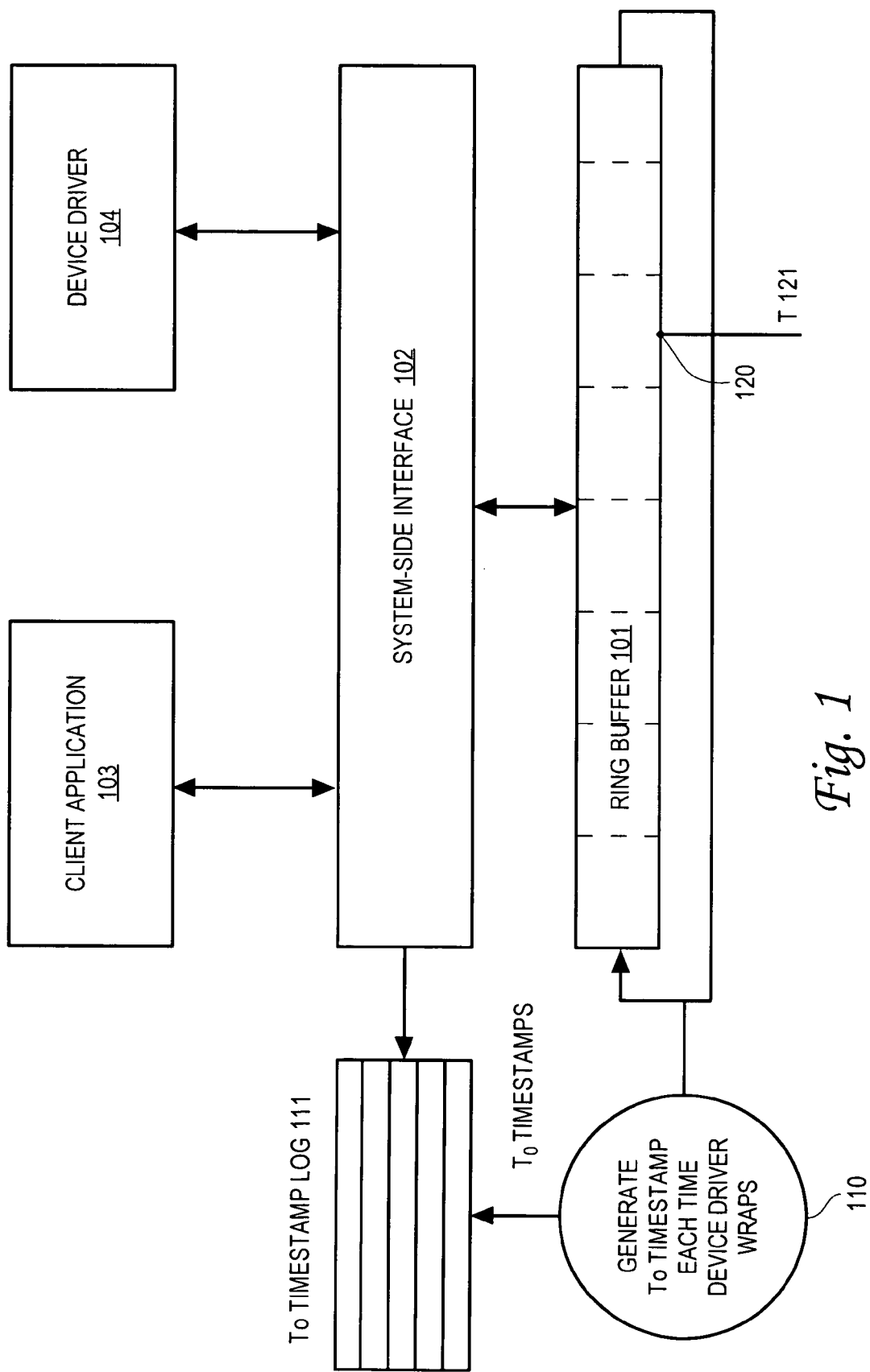
FIG. 1 is a block diagram of a system in which audio is communicated between a client application, a system-side interface and a device driver that communicate audio data through the use of a ring buffer according to an embodiment of the present invention.

FIG. 1 is a block diagram depicting participants and components of an audio I/O system that participate to provide decoupled communication of audio data used to illustrate an embodiment of the present invention. Referring to FIG. 1, audio I/O system includes ring buffer 101, and system-side interface 102, client application 103, and device driver 104. System-side interface 102 is a system-side entity through which applications communicate audio data to audio devices and vice versa. System-side interface 102 may be, for example, an Audio Hardware Abstraction Layer (HAL) provided in the core audio framework of MAC OS X, available from Apple Computer, Inc. To read data from ring buffer 101, device driver 104 invokes a function or routine of system-side interface 102. Device driver 104 is executed by one or more device threads on a computer system. For example, device driver 104 may be executed by multiple device threads on a computer system, one thread is a thread executing on a CPU and the other thread is a thread that is executing on a direct memory access ("DMA") co-processor and that reads data from ring buffer 101 for the audio device. Alternatively, the device driver may be executed by only a thread executing on a CPU, which reads data from ring buffer 101 and transmits the data to an audio device.

Client application 103 performs a client write operation to ring buffer 101 by invoking a function or routine of system-side interface 102. Client application 103 is executed by a client thread.

For convenience of expression, software components, such as device driver 104 and system-side interface 102, are described as performing operations when, in fact, a processor executing the software instructions within a thread and process performs the operations in response to executing the software instructions. For example, stating that device driver 104 reads data from ring buffer 101 is a convenient way of stating that a processor on a computer system (e.g. CPU, DMA coprocessor) within a thread reads data from ring buffer 101 in response to executing instructions in device driver 104.

Device driver 104 reads audio data from ring buffer 101 at a specific position within ring buffer 101. The position in ring buffer 101 at which device driver 104 is reading audio data is referred to herein as the driver position. The driver position repeatedly wraps around to the start of ring buffer 101.

Client application 103 is polled at intervals to perform write operations to ring buffer 101. This is accomplished by scheduling a client thread to wake up at a particular time to call and/or execute client application 103 to perform write operations to add a buffer unit of data to ring buffer 101 and then cease executing.

Client application 103 specifies to system-side interface 102 the size of the buffer unit by calling a function of system-side interface 102. The size may be specified by specifying a quantum of data (e.g. 512 bytes) or a buffer unit duration.

A position in ring buffer 101 corresponds to a particular time. For convenience of expression, the position in a ring buffer may be referred to by the position's corresponding time. Thus, for example, stating that the driver position is at time $T_{121}$ in ring buffer 101 is just a convenient way of stating that the driver position is at a position 120 in ring buffer 101 that corresponds to time $T_{121}$.

$T_0$ Timestamps

To place and/or schedule placement of data within ring buffer 101, system-side interface 102 needs to know the device position. However, it is inefficient for device driver 104 to continuously communicate its position to system-side interface 102. Therefore, according to an embodiment of the present invention, device driver 104 periodically generates information that system-side interface 102 can use to estimate the current device position.

In an embodiment of the present invention, the information used by system-side interface 102 to estimate the current driver position is timestamp information generated by device driver 104 when device driver 104 performs a wrap around operation i.e. when the driver position advances from the end of ring buffer 101 to the beginning of ring buffer 101. When the driver position reaches the beginning of ring buffer 101, device driver 104 generates a timestamp, referred to as a $T_0$ timestamp, that indicates the current clock time of a CPU clock. (see operation 110 in FIG. 1). Thus, a $T_0$ timestamp represents the time that the driver position is at the beginning of ring buffer 101.

For example, the device driver 104, being executed by a thread on a DMA co-processor, detects that it has reached the beginning of ring buffer 101. The DMA co-processor raises an interrupt causing the device driver 104 to record the CPU time as a $T_0$ timestamp.

The generated $T_0$ timestamps are stored as records in $T_0$ timestamp log 111. From the history of $T_0$ timestamps in $T_0$ timestamp log 111, system-side interface 102 is able to estimate the driver position at a given point in time, and the rate at which the device position moves through the ring buffer. Estimating the driver position involves, for example, averaging intervals between $T_0$ timestamps to determine an average rate at which the device position moves through the ring buffer. Based on the average rate and most recently generated $T_0$ timestamp, the driver position may be estimated. Other statistical techniques can be used to estimate the rate.

Determining Client-Side Offset

Figure 2:
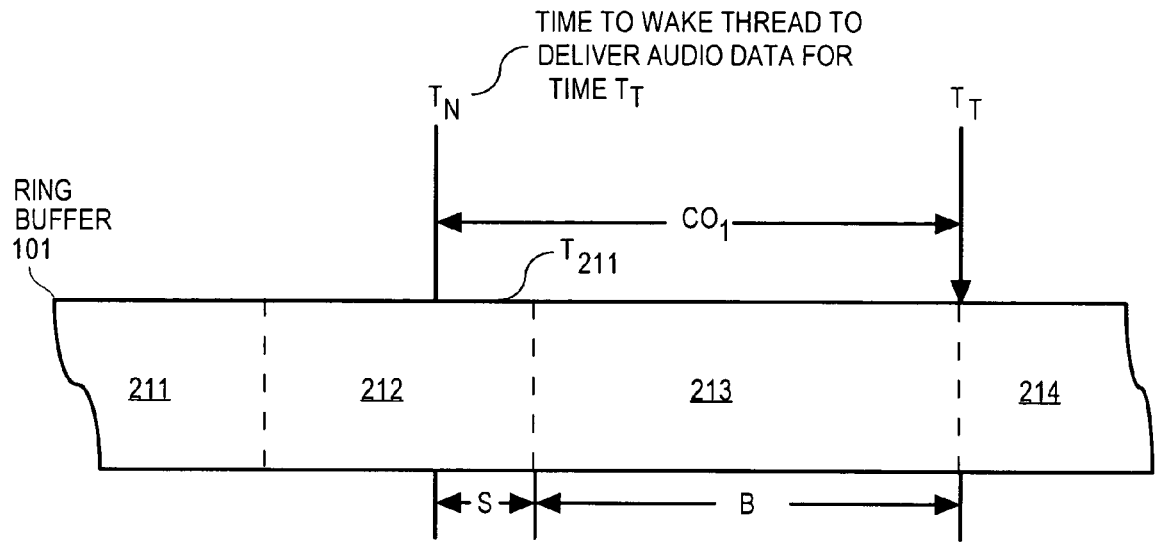
FIG. 2 is a diagram depicting a time based representation of a ring buffer used to illustrate how a thread is scheduled to write data to the buffer.

To schedule when to wake up a client thread to perform a client write operation to add audio data for a target time in ring buffer 101, a client-side offset is determined and used. FIG. 2 is a diagram depicting a time based representation of ring buffer 101 that is used to illustrate how a client-side offset is estimated and used to perform such scheduling.

Referring to FIG. 2, it shows a time based representation of ring buffer 101 divided into buffer units of data 211, 212, 213, and 214. Positions along the time based representation correspond to a time. The beginning and ending boundaries of buffer units of data 211, 212, 213, and 214 correspond to the beginning and ending time of the buffer unit's duration. The beginning and ending of buffer unit of data 213 corresponds to times $T_{211}$ and $T_T$. The beginning of buffer unit of data 214 corresponds to time $T_T$. To insert audio data for target time $T_T$, client application 103 performs a write operation. System-side interface 102 schedules a client thread to wake and call and/or execute client application 103 to perform the write operation and insert audio data for time $T_T$ in buffer unit 214. The thread is scheduled to wake at time $T_N$, which is determined by subtracting the client-side offset $CO_1$ from time $T_T$.

Client-side offset $CO_1$ is calculated based on the following formula:

$$CO_1 = S + B, \text{ where:}$$

S=Time Safety Offset—an estimate of and allowance for a margin of error in the $T_0$ timestamps.

B=Buffer unit duration

S—Time safety offset

The time safety offset represents the margin of error between $T_0$ timestamps recorded for occurrences of a device position reaching the beginning of the ring buffer and the true time of the device position actually reached the beginning. There are various sources of this error. $T_0$ timestamps are generated by system-side interface 102 during the execution of a device thread. Between the time when the device position reaches the beginning of ring buffer 101, and when system-side interface 102 detects that the beginning has been reached and reads a CPU clock time, time has elapsed. Thus, the time the beginning of the buffer was reached and time recorded are not the same.

Another source of the margin of error is interrupt latency. Interrupt latency is the amount of time between when a co-processor (e.g. DMA co-processor) raises an interrupt to a CPU and when the CPU begins servicing the interrupt. To generate a $T_0$ timestamp, an audio device raises an interrupt to indicate that it has reached the beginning of ring buffer 101, causing device driver 104 to record the CPU time as a $T_0$ timestamp. There is interrupt latency between when the interrupt is raised and the response to capture the CPU time. The interrupt latency affects the accuracy of the time captured as the $T_0$ timestamp.

There are other factors concerning the physical limitations of the hardware that can be accounted for in the safety offset. For example, some hardware can only move data in chunks. Another example is that some hardware has a limit on how often the hardware can schedule an interrupt with the CPU (e.g. USB hardware only works in 1 millisecond chunks of time).

Buffer Unit Duration

As mentioned earlier, it can be assumed that the amount of time a client application uses to perform a write operation is the duration of the buffer unit inserted by the write operation. To determine a client-side offset, it can be assumed that the client application uses this amount of time to perform the write operation. If a buffer unit's duration is 11 milliseconds, then client application 103 is allowed and is assumed to use 11 milliseconds to perform a write operation to add a buffer unit of data to ring buffer 101.

As mentioned before, client application 103 specifies the buffer unit size or duration. Ostensibly, to improve latency, the client-side offset may be reduced by specifying a smaller buffer unit size. However, to communicate a given quantity of data via ring buffer 101, reducing the buffer unit size means client application 103 will be polled more often to deliver more but smaller buffer units of data, that a client thread will be scheduled to more frequently execute a client write operation, and that other sorts of operations need to be performed more frequently. As a result, more processing and overhead is incurred to communicate the given quantity of data.

Decreasing Client-Side Offset without Decreasing Buffer Unit

Figure 3:
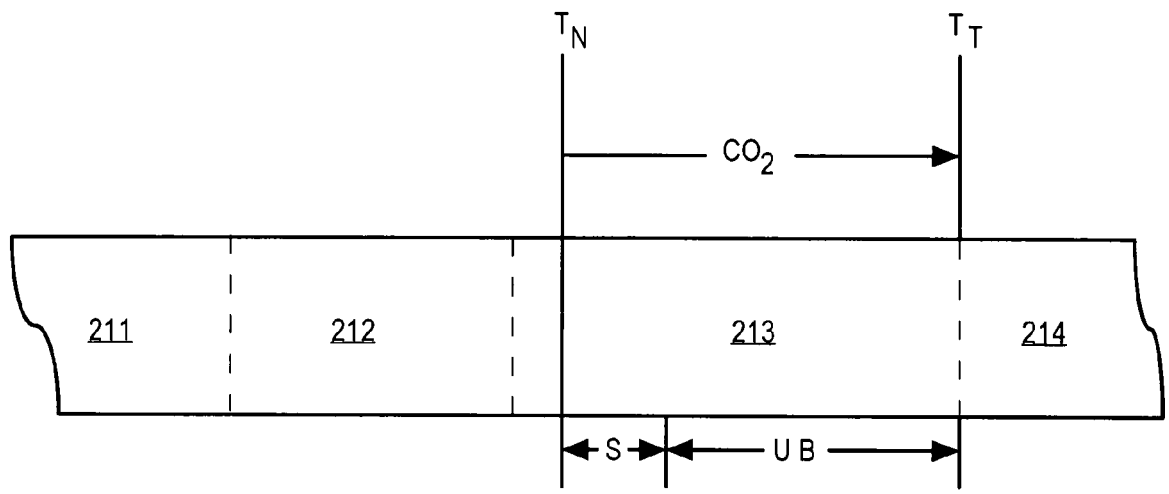
FIG. 3 is a diagram depicting a time based representation of a ring buffer used to illustrate how a thread is scheduled to write data to the buffer according to an embodiment of the present invention.

Often, client application 103 can perform a client write operation faster than the buffer unit duration. According to an embodiment of the present invention, client application 103 can specify a co-efficient to apply to B to reduce the client-side offset and the attendant built-in latency. The co-efficient can be specified by invoking a function of system-side interface 102. The co-efficient value that may be specified is between 0 and 1. FIG. 3 is a diagram depicting a time based representation of ring buffer 101 used to illustrate how a client-side offset is calculated using this co-efficient.

Referring to FIG. 3, it shows the portion of ring buffer 101 depicted in FIG. 2. Time $T_N$ is calculated by subtracting client-side offset $CO_2$ from $T_T$. $CO_2$ is less than $CO_1$ because it is calculated based on a co-efficient that, as supplied by application 103, is less than one, according to the following formula.

$$CO_2 = S + UB, \text{ where U is the coefficient.}$$

In FIG. 3. co-efficient U is less than 1. Thus, $T_N$ is closer to $T_T$.

Use of the co-efficient allows reduction of the client-side offset without having to change the buffer unit size. Thus, the client-side offset and the attendant built-in latency is reduced without the overhead cost associated with reducing the buffer unit size.

In addition, the co-efficient may be specified by a client-application. This allows developers of the client application to control latency and implement logic within a client application to determine an optimal co-efficient under a variety of conditions. Finally, the co-efficient may be set dynamically, that is, may be set after and while a ring buffer is being used to communicate data between the client application and the device driver.

Hardware Overview

Figure 4:
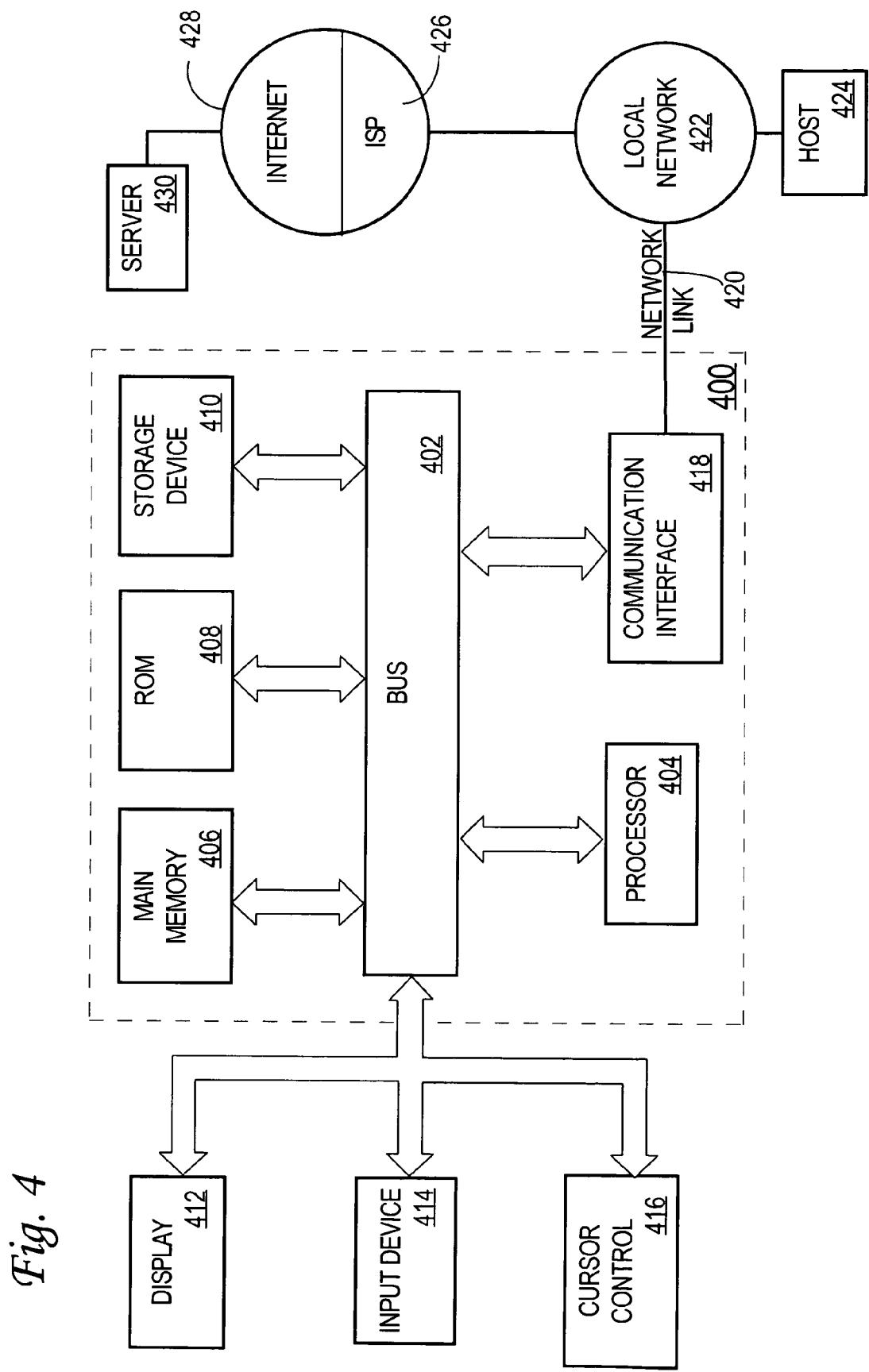
FIG. 4 is a block diagram illustrating a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing latency when communicating data between an application executing on a computer system and a driver of a device coupled to the computer system comprising:

computing an offset period as a period of time in advance of a particular time to commence execution of the application to insert a unit of data into a buffer such that the unit of data is ready for access by the driver at the particular time;

wherein computing an offset period is based on a plurality of factors that include:
  a period of time established for the application to deliver said unit of data into said buffer, and
  a weight to apply to the period of time established for the application to deliver said unit of data, wherein a value for the weight is supplied by the application to reduce the offset period; and causing, in accordance with the offset period, the unit of data to be inserted into the buffer such that the unit of data is ready for access by the driver at the particular time.

2. The method of claim 1, further comprising:
establishing said unit of data as a certain unit of data said application causes to be added to the buffer when called to perform a write operation to the buffer; and
wherein the certain unit of data corresponds to a period of output generated by said device in response to receiving the certain unit of data.

3. The method of claim 2, wherein the application specifies the certain unit of data.

4. The method of claim 1, wherein:
the value for the weight is limited to between zero and 1; and
computing an offset period is based on the product of the value for the weight and the period of time established for the application to deliver said unit of data.

5. The method of claim 1, further comprising:
receiving, from the application, first data to be added to said buffer; and after said first data is added to said buffer:
  receiving, from the application, a new value, that is different than said value, for the weight,
  computing a new offset period based on the new value, and
  adding second data to said buffer based on the new offset period.

6. The method of claim 1, further comprising scheduling multiple cycles to wake a thread, wherein for each cycle of said multiple cycles:
said thread is awakened to execute the application to perform a write operation to insert data at a particular insertion position in said buffer; and
said thread is scheduled to awaken said offset period in advance of said driver reading data at said insertion position.

7. The method of claim 1, further including comprising:
generating a plurality of timestamps that represent the time the driver wraps around to a particular position in the buffer;
generating an estimate of a particular position at which the driver is reading data from said buffer based on the plurality of timestamps.

8. The method of claim 7, the steps further including:
determining a margin of error for said estimate; and
wherein the plurality of factors on which said offset period is based includes said margin of error.

9. The method of claim 1, wherein:
a first thread executes said application; and
a second thread executes said driver.

10. The method of claim 1, wherein the buffer stores multimedia data.

11. The method of claim 10, wherein the buffer stores audio data.

12. A volatile or non-volatile computer-readable medium carrying one or more sequences of instructions which, when executed by one or more processors, causes the one or more processors to perform the method recited in claim 1.

13. A volatile or non-volatile computer-readable medium carrying one or more sequences of instructions which, when executed by one or more processors, causes the one or more processors to perform the method recited in claim 2.

14. A volatile or non-volatile computer-readable medium carrying one or more sequences of instructions which, when executed by one or more processors, causes the one or more processors to perform the method recited in claim 3.

15. A volatile or non-volatile computer-readable medium carrying one or more sequences of instructions which, when executed by one or more processors, causes the one or more processors to perform the method recited in claim 4.

16. A volatile or non-volatile computer-readable medium carrying one or more sequences of instructions which, when executed by one or more processors, causes the one or more processors to perform the method recited in claim 5.

17. A volatile or non-volatile computer-readable medium carrying one or more sequences of instructions which, when executed by one or more processors, causes the one or more processors to perform the method recited in claim 6.

18. A volatile or non-volatile computer-readable medium carrying one or more sequences of instructions which, when executed by one or more processors, causes the one or more processors to perform the method recited in claim 7.

19. A volatile or non-volatile computer-readable medium carrying one or more sequences of instructions which, when executed by one or more processors, causes the one or more processors to perform the method recited in claim 8.

20. A volatile or non-volatile computer-readable medium carrying one or more sequences of instructions which, when executed by one or more processors, causes the one or more processors to perform the method recited in claim 9.

21. A volatile or non-volatile computer-readable medium carrying one or more sequences of instructions which, when executed by one or more processors, causes the one or more processors to perform the method recited in claim 10.

22. A volatile or non-volatile computer-readable medium carrying one or more sequences of instructions which, when executed by one or more processors, causes the one or more processors to perform the method recited in claim 11.

23. A method of managing latency when communicating audio data between an application executing on a computer system and a driver of a device coupled to the computer system comprising:
computing an offset period as a period of time in advance of a particular time to commence execution of the application to insert a unit of data into a buffer such that the unit of data is ready for access by the driver at the particular time;
wherein computing an offset period is based on a plurality of factors that include:
  a period of time established for the application to deliver said unit of data into said buffer, and
  a value for a weight to apply to said period of time established for the application to deliver said unit of data; and
causing, in accordance with the offset period, the unit of data to be inserted into the buffer such that the unit of data is ready for access by the driver at the particular time.

24. The method of claim 23, further comprising establishing, for the application, the value for the weight.

25. The method of claim 24, wherein establishing, for the application, the value for the weight is based on a value supplied by the application.

26. The method of claim 23, wherein:
the value for the weight is limited to between zero and 1; and
computing an offset period is based on the product of the value for the weight and the period of time established for the application to deliver said unit of data.

27. The method of claim 23, further comprising:
receiving, from the application, first data to be added to said buffer; and after said first data is added to said buffer:
receiving, from the application, a new value, that is different than said value, for the weight,
computing a new offset period based on the new value, and
adding second data to said buffer based on the new offset period.

28. The method of claim 23, further comprising scheduling multiple cycles to wake a thread, wherein for each cycle of said multiple cycles:
said thread is awakened to execute the application to perform a write operation to insert data at a particular insertion position in said buffer; and
said thread is scheduled to awaken said offset period in advance of said driver reading data at said insertion position.

29. A volatile or non-volatile computer-readable medium carrying one or more sequences of instructions which, when executed by one or more processors, causes the one or more processors to perform the method recited in claim 23.

30. A volatile or non-volatile computer-readable medium carrying one or more sequences of instructions which, when executed by one or more processors, causes the one or more processors to perform the method recited in claim 24.

31. A volatile or non-volatile computer-readable medium carrying one or more sequences of instructions which, when executed by one or more processors, causes the one or more processors to perform the method recited in claim 25.

32. A volatile or non-volatile computer-readable medium carrying one or more sequences of instructions which, when executed by one or more processors, causes the one or more processors to perform the method recited in claim 26.

33. A volatile or non-volatile computer-readable medium carrying one or more sequences of instructions which, when executed by one or more processors, causes the one or more processors to perform the method recited in claim 27.

34. A volatile or non-volatile computer-readable medium carrying one or more sequences of instructions which, when executed by one or more processors, causes the one or more processors to perform the method recited in claim 28.

* * * * *

UNITED STATES PATENT AND TRADEMARK OFFICE
CERTIFICATE OF CORRECTION

PATENT NO.         : 7,792,024 B1                           Page 1 of 1
APPLICATION NO.    : 11/083829
DATED              : September 7, 2010
INVENTOR(S)        : Jeffrey C. Moore et al.

It is certified that error appears in the above-identified patent and that said Letters Patent is hereby corrected as shown below:

Title page 2, Item (56) in the "Other Publications" section, please insert at the end -- U.S. Application No. 10/877,762, Ex Parte Quayle OA of May 29, 2009
   U.S. Application No. 10/877,762, Notice of Allowance of July 23, 2009
   U.S. Application No. 11/083,671, Notice of Allowance of August 6, 2009 --.

In column 6, line 43, delete "FIG. 3." and insert -- FIG. 3, --, therefor.

In column 8, line 64, in claim 1, after "system" insert -- , --.

In column 9, line 50, in claim 7, after "further" delete -- including --.

In column 10, line 49, in claim 23, after "system" insert -- , --.

Signed and Sealed this
Twenty-ninth Day of November, 2011

David J. Kappos
*Director of the United States Patent and Trademark Office*